(12) United States Patent
Camilleri

(10) Patent No.: US 7,680,640 B2
(45) Date of Patent: Mar. 16, 2010

(54) SYSTEMS AND METHODS FOR UTILIZING CELL BASED FLOW SIMULATION RESULTS TO CALCULATE STREAMLINE TRAJECTORIES

(75) Inventor: Dominic Camilleri, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 12/328,056

(22) Filed: Dec. 4, 2008

(65) Prior Publication Data

US 2009/0150097 A1    Jun. 11, 2009

Related U.S. Application Data

(60) Provisional application No. 61/005,786, filed on Dec. 7, 2007.

(51) Int. Cl.
*G06G 7/48* (2006.01)
(52) U.S. Cl. .............................. 703/10; 703/9
(58) Field of Classification Search ................ 703/10, 703/9
See application file for complete search history.

(56) References Cited

U.S. PATENT DOCUMENTS

| | | | |
|---|---|---|---|
| 5,174,377 A | 12/1992 | Kumar | |
| 5,459,820 A | 10/1995 | Schroeder et al. | |
| 5,710,726 A | 1/1998 | Rowney et al. | |
| 5,784,538 A | 7/1998 | Dzyacky | |
| 5,881,811 A | 3/1999 | Lessi et al. | |
| 6,108,608 A | 8/2000 | Watts, III | |
| 6,519,531 B1 | 2/2003 | Batyckty et al. | |
| 6,668,922 B2 | 12/2003 | Ziauddin et al. | |
| 7,059,180 B2 | 6/2006 | Al-Ghamdi | |
| 7,164,990 B2 | 1/2007 | Bratvedt et al. | |
| 7,289,942 B2 | 10/2007 | Yang et al. | |
| 7,346,457 B2 | 3/2008 | Jalali et al. | |
| 2002/0199156 A1 | 12/2002 | Chess et al. | |
| 2005/0209866 A1 | 9/2005 | Veeningen et al. | |
| 2007/0199721 A1 | 8/2007 | Givens et al. | |
| 2008/0167849 A1 | 7/2008 | Hales et al. | |

FOREIGN PATENT DOCUMENTS

| | | |
|---|---|---|
| EP | 1729152 A1 | 12/2006 |
| WO | 0032905 A2 | 6/2000 |
| WO | 0127755 A1 | 4/2001 |
| WO | 02018747 A1 | 3/2002 |

OTHER PUBLICATIONS

Koyamada et al. Seed Specification for Displaying a Streamline in an Irregular Volume, Engineering with Computers (1998) 14:73-80, 1998.*

Niethammer et al. Fiber Bundle Estimation and Parameterization, R. Larsen, M. Nielsen, and J. Sporring (Eds.): MICCAI 2006, LNCS 4191, pp. 252-259, 2006.*

(Continued)

*Primary Examiner*—Hugh Jones
(74) *Attorney, Agent, or Firm*—Crain Caton & James

(57) ABSTRACT

Systems and methods for utilizing finite difference simulation results to compute streamline trajectories, which may be used to analyze the results with other streamline techniques.

14 Claims, 11 Drawing Sheets

OTHER PUBLICATIONS

Bodnar; FP-6 Strep 30717 Plato-N (Aeronautics and Space) Plato-N; Plato-N Public Report PU-R-5-2007; Jun. 20, 2007; pp. 1-25.*

Jobard et al.; Creating Evenly-Spaced Streamlines of Arbitrary Density (1997) In Proc. of 8th Eurographics Workshop on Visualization in Scientific Computing. pp. 1-13.*

Datta-Gupta, Akhil "An Integrated Approach to Characterizing Bypassed Oil in Heterogeneous and Fractured Reservoirs Using Partitioning Tracers" Annual Report, Jun. 2004; pp. 1-128.

Stenerud, V.K., Kippe ,V., Lie K.A., Datta-Gupta, A. "Adaptive Multiscale Streamline Simulation and Inversion for High-Resolution Geomodels" [abstract] SPE Journal, vol. 13, No. 1, Mar. 2008, Paper No. 106228-PA. 2 pages.

Matringe, S.F., Juanes, R., Tchelepi, H.A. "Streamline tracing on general triangular or quadrilateral grids" [abstract] SPE Journal, 2007, vol. 12, No. 2, Jun. 2007. Paper No. 96411-PA. 2 pages.

Matringe, S.F., Juanes, R., Tchelepi, H.A. "Tracing Streamlines on Unstructured Grids from Finite Volume Discretizations" [abstract] SPE Annual Technical Conference and Exhibition, Sep. 24-27, 2006, San Antonio, Texas, USA; Paper No. 103295-MS. 2 pages.

Sun, S., Gai, X., and Wheeler, M.F. "Streamline Tracing on Unstructured Grids" [abstract] SPE Annual Technical Conference and Exhibition, Oct. 9-12, 2005, Dallas, Texas; Paper No. 96947-MS. 2 pages.

Matringe, S.F., Gerritsen, M.G.; "On Accurate Tracing of Streamlines" [abstract] SPE Annual Technical Conference and Exhibition, Sep. 26-29, 2004, Houston, Texas. Paper No. 89920-MS. 2 pages.

Mishal Habis Al Harbi "Streamline-Based Production Data Integration in Naturally Fractured Reservoirs" Dissertation, Texas A&M University, May 2005. pp. 1-120.

Datta-Gupta, Akhil "Streamline Simulation: A Technology Update (includes associated papers 71204 and 71764)" [abstract] SPE Journal of Petroleum Technology, vol. 52, No. 12; Dec. 2000; Paper No. 65604-MS. 2 pages.

International Search Report & Written Opinion for International Patent Application No. PCT/US2008/085476; 14 pgs.; European Patent Office, Jun. 7, 2009.

Sato, Kozo; Comparison of the Boundary Element Methods for Streamline Tracking; Journal of Petroleum Science Engineering; pp. 29-42; Elsevier Science B.V., Mar. 2001.

Article 34 Response to the Written Opinion for International Patent Application No. PCT/US2008/085476; 3 pgs.; Aug. 26, 2009.

Method for Changing the Scale of Absolute Permeabilities to Build a Flow Simulation Model, EP1729152 A1 [abstract] 1 pg., Dec. 6, 2006.

J. Liu, E.D Parker, D. Camilleri; "A New Particle Tracking Algorithm for Tracer Flow Simulation" SPE Reservoir Simulation Symposium, Houston, Texas; Feb. 14-17, 1999; pp. 1-8; Paper No. 51905; Society of Petroleum Engineers Inc.

* cited by examiner

US 7,680,640 B2

SYSTEMS AND METHODS FOR UTILIZING CELL BASED FLOW SIMULATION RESULTS TO CALCULATE STREAMLINE TRAJECTORIES

CROSS-REFERENCE TO RELATED APPLICATIONS

This application claims priority from U.S. Provisional Patent Application No. 61/005,786, filed on Dec. 7, 2007, which is incorporated herein by reference.

STATEMENT REGARDING FEDERALLY SPONSORED RESEARCH

Not applicable.

FIELD OF THE INVENTION

The present invention generally relates to systems and methods for calculating streamline trajectories, also referred to as streamlines, which may be used to analyze cell based flow simulation results. More particularly, the present invention utilizes the results from finite difference flow simulators to calculate the streamline trajectories, which may be used with other streamline techniques to analyze the results.

BACKGROUND OF THE INVENTION

In the field of oil and gas production, the hydrocarbon reservoir is exploited when one or more well bores are drilled into the reservoir and liquid hydrocarbons (e.g. oil and gas) are extracted from the reservoir through the well bores. In this event, the well bore is generally referred to as a producing well bore or a producer. A fluid, typically water, is introduced into the reservoir at one or more points away from the producers to displace liquid or gaseous hydrocarbons, which causes them to be expelled from the reservoir through the producers. The point at which water is introduced into the reservoir is generally referred to as an injector.

The expulsion of liquid and/or gaseous hydrocarbons at the producers and the injection of water at the injectors establish a fluid flow pattern in the reservoir, which may be influenced by gravity. The fluid flow within the reservoir may be modeled as a function of time in order to predict how the production of liquid and/or gaseous hydrocarbons from a particular producer will vary over the lifetime of the reservoir.

A mathematical model of the fluid flow in a given reservoir may be constructed by techniques well known in the art. These techniques, however, are not exact and may be implemented using other numerical techniques to arrive at an estimated solution such as, for example, streamline techniques and finite difference techniques. These techniques, and their drawbacks, are more particularly described in U.S. Pat. No. 7,164,990, which is incorporated herein by reference.

The '990 patent generally relates to a method for determining fluid flow and processing fluid flow data related to a hydrocarbon reservoir using a streamline simulator and a finite difference simulator. The '990 patent describes a method for determining fluid flow in a volume containing two or more fluid components, which comprises determining one or more streamlines from a pressure field and solving for the fluid composition along each streamline. The method also includes solving for the pressure along each streamline and suggests using a finite difference technique for solving the fluid composition and/or pressure along each streamline. The '990 patent includes a flow chart (FIG. 2) illustrating a conventional streamline technique and computes the streamlines from the pressure field. The '990 patent, however, does not teach or suggest a system or method for using finite difference reservoir simulation results for computing the streamlines. Moreover, the '990 patent fails to teach or suggest streamline techniques, which include the use of streamline trajectories, to analyze the finite difference flow simulation results.

There is therefore, a need for streamline techniques that may be performed using streamline computations without the need for conventional streamline simulation. There is also a need for streamline techniques that include the use of streamline trajectories to analyze finite difference flow simulation results. Finally, there is a need for computing streamlines using finite difference flow simulation results.

SUMMARY OF THE INVENTION

The present invention therefore, meets the above needs and overcomes one or more deficiencies in the prior art by providing systems and methods for utilizing cell-based flow simulation results to calculate streamline trajectories.

In one embodiment, the present invention includes a method for calculating a streamline, which comprises i) initializing a seed point within a simulation grid cell; (ii) computing a velocity vector for the seed point; (iii) selecting an incremental distance in a direction of the velocity vector; (iv) computing coordinates for a new seed point location based on the incremental distance and the direction of the velocity vector; v) computing another velocity vector for the seed point; vi) selecting an incremental distance in a direction of the another velocity vector; vii) computing coordinates for another new seed point location based on the incremental distance and the direction of the another velocity vector; viii) computing an incremental time of flight for each incremental distance based on a velocity for each respective velocity vector and the respective incremental distance or a velocity for each respective another velocity vector and the respective incremental distance; ix) mapping a color for each incremental time of flight to each respective incremental distance; x) computing an accumulated time of flight based on a sum total of each incremental time of flight; xi) adjusting the accumulated time of flight to zero at an end of the streamline nearest the injection well; and xii) displaying each color representing the accumulated time of flight on the streamline between the end of the streamline nearest the injection well and another end of the streamline nearest the production well or the stagnation region.

In another embodiment, the present invention includes a program carrier device having computer executable instructions for calculating a streamline. The instructions are executable to implement (i) initializing a seed point within a simulation grid cell; (ii) computing a velocity vector for the seed point; (iii) selecting an incremental distance in a direction of the velocity vector; (iv) computing coordinates for a new seed point location based on the incremental distance and the direction of the velocity vector; v) computing another velocity vector for the seed point; vi) selecting an incremental distance in a direction of the another velocity vector; vii) computing coordinates for another new seed point location based on the incremental distance and the direction of the another velocity vector; viii) computing an incremental time of flight for each incremental distance based on a velocity for each respective velocity vector and the respective incremental distance or a velocity for each respective another velocity vector and the respective incremental distance; ix) mapping a color for each incremental time of flight to each respective incremental distance; x) computing an accumulated time of flight based on a sum total of each incremental time of flight; xi) adjusting the accumulated time of flight to zero at an end of the streamline nearest the injection well; and xii) displaying each color representing the accumulated time of flight on the streamline between the end of the streamline nearest the injection well and another end of the streamline nearest the production well or the stagnation region.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

Method Description

Figure 1A:
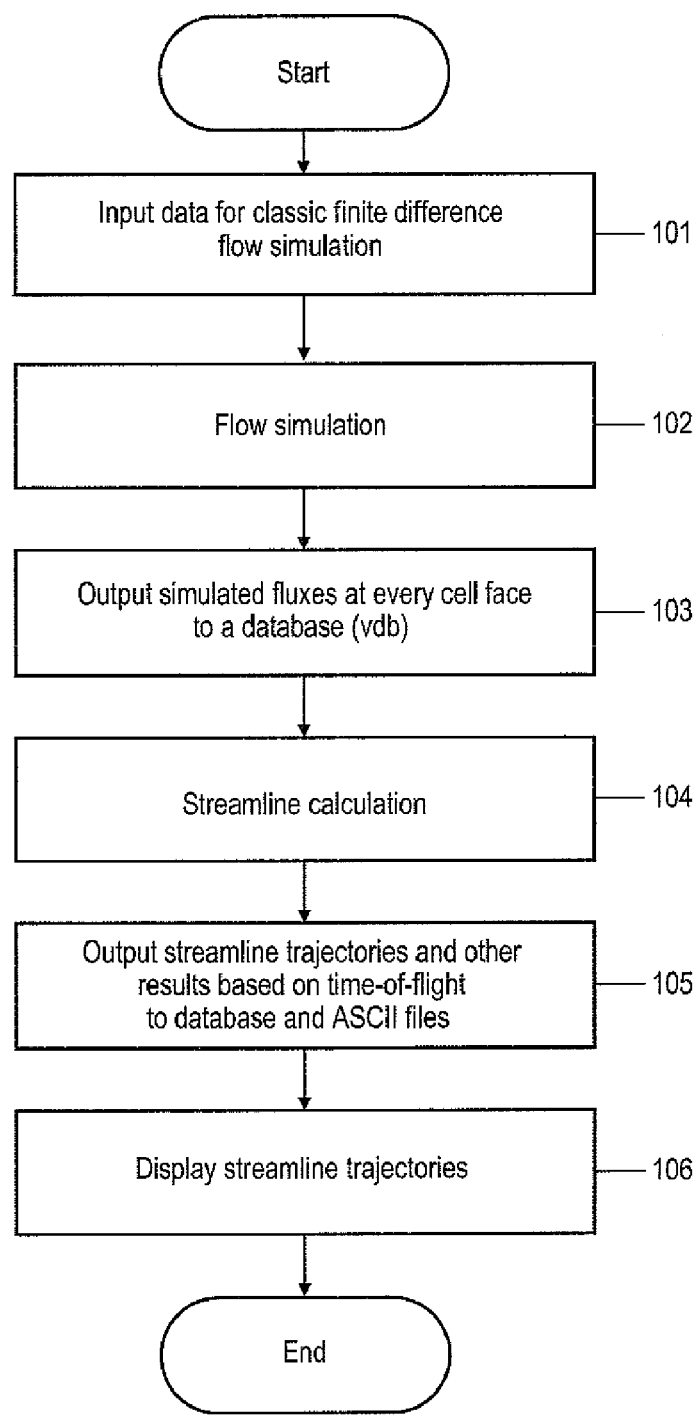
FIG. 1A is a flow diagram illustrating a work flow incorporating the present invention.

Referring now to FIG. 1A, a flow diagram of a work flow implementing the present invention is illustrated. In step 101, data for classic finite difference flow simulation is input into a computer system through a client interface.

In step 102, the input data is accessed by a flow simulator for flow simulation. Acceptable flow simulators may include, for example, Nexus® and VIP®, which are commercial software applications marketed by Landmark Graphics Corporation. The flow simulator generates flux data by calculating phase fluxes through the six sides (faces) of a three-dimensional simulation (grid) cell, which are written to a database such as, for example, the VIP® results database ("VDB") in the computer system at step 103 as simulated fluxes at each cell face. Normalized velocity, for example, is output to the database and may be defined as:

$$\frac{\text{Velocity} \times \text{Face Area}}{\text{Bulk Volume}}$$

For each phase, six velocity arrays are mapped, two for each coordinate, which are described in Table 1 below.

TABLE 1

| Phase | Output Velocity Arrays | Description |
| --- | --- | --- |
| Oil | VLNOX−<br>VLNOX+<br>VLNOY−<br>VLNOY+<br>VLNOZ−<br>VLNOZ+ | Normalized oil phase velocity for each direction of the faces of a grid cell: one in the + direction and one in the − direction. |
| Gas | VLNGX−<br>VLNGX+<br>VLNGY−<br>VLNGY+<br>VLNGZ−<br>VLNGZ+ | Normalized gas phase velocity for each direction of the faces of a grid cell: one in the + direction and one in the − direction. |
| Water | VLNWX−<br>VLNWX+<br>VLNWY−<br>VLNWY+<br>VLNWZ−<br>VLNWZ+ | Normalized water phase velocity for each direction of the faces of a grid cell: one in the + direction and one in the − direction. |

In step 104, a streamline analysis module ("StreamCalc") reads the flux data from the database and calculates streamline trajectories and time-of-flight derived quantities. The StreamCalc results may also include map, plot and streamline data, which are written to the same database used for reading the flux data. The database may comprise a group of folders and files that contain the streamline and other output needed to display the streamline trajectories at step 106.

Figure 2A:
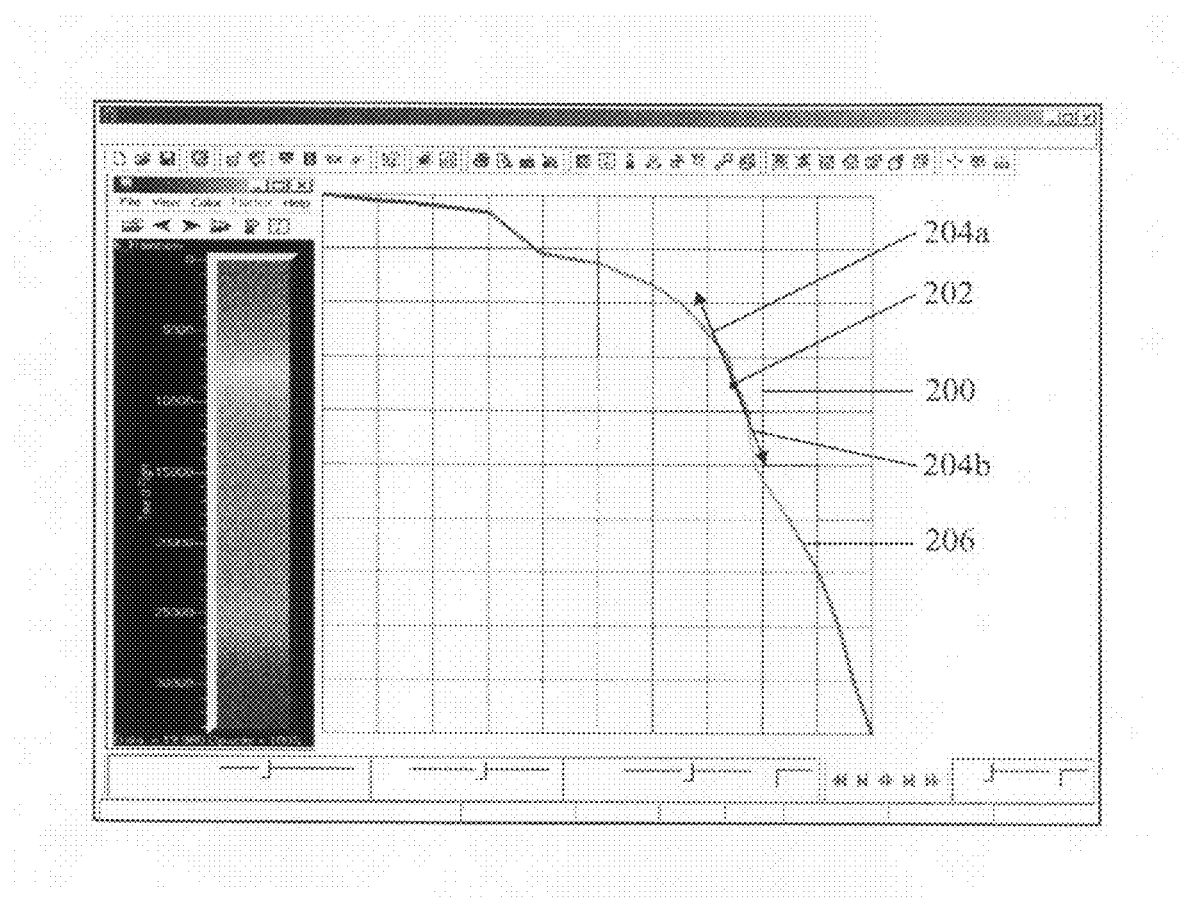
FIG. 2A illustrates an exemplary display of a streamline trajectory computed according to the present invention.

An exemplary display of a streamline trajectory computed at step 104 is illustrated in FIG. 2A. The shading along the streamline is a quantification of the time-of-flight for a particle as it traverses along the streamline from one end to the other. Color coding the streamline, instead of shading the streamline, may be preferred to quantify the time-of-flight for a particle. Regardless, color coding the streamline, as described herein, may include mapping the same color as different shades (i.e. shading) or mapping different colors. The streamline 206 is computed by starting at the center of a simulation grid cell 200 and moving a seed point 202 with coordinates (x, y, z) incrementally along a velocity vector 204a in the direction of the flow at that location. The velocity vector 204a is updated at the new seed point location and the process is repeated until the new seed point location coordinates reach a production well or a point of zero velocity (stagnation). The process may be repeated in the opposite direction by moving the seed point 202 with coordinates (x, y, z) incrementally along another velocity vector 204b in the opposite direction of the flow at that location. The another velocity vector 204*b* is updated at the new seed point location and the process is repeated until the new seed point location coordinates reach an injection well or a point of zero velocity (stagnation). This process may be repeated for each cell in FIG. 2A, which allows for tagging the cell volumes to injection and production wells or to a stagnation region. For added resolution, multiple seed points (starting points) within a cell may be used, in which case the cell volume is allocated to each streamline in proportion to the number of seed points.

The invention therefore, allows for the use of streamline analysis techniques, which are unique to streamline based simulators, to analyze finite difference reservoir simulation results. The StreamCalc results may be used to analyze non-convective situations such as, for example, primary depletion, highly compressible fluids, gravity-dominated flow, and problems sensitive to capillary effects. The StreamCalc results may be used to identify sweep efficiencies, visualize injector-producer pair groupings, and use time-of-flight methods to understand their primary recovery mechanisms. From the StreamCalc results, both simulation and non-simulation users can make recommendations to modify water injection rates for efficient volumetric sweep and maximize oil production. As a result, a streamline analysis may be performed using the StreamCalc results without the need for conventional streamline simulation.

Figure 3A:
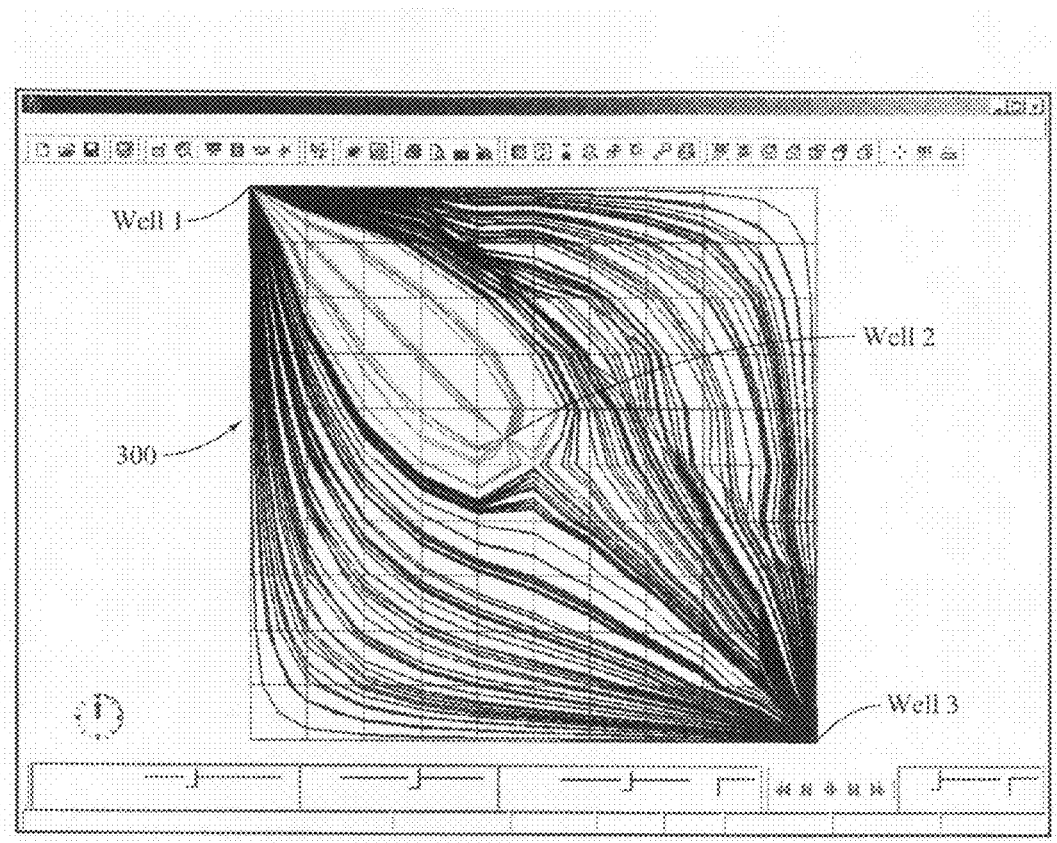
FIG. 3A illustrates an exemplary display of a flow field produced by the streamline analysis techniques of the present invention.
Figure 4:
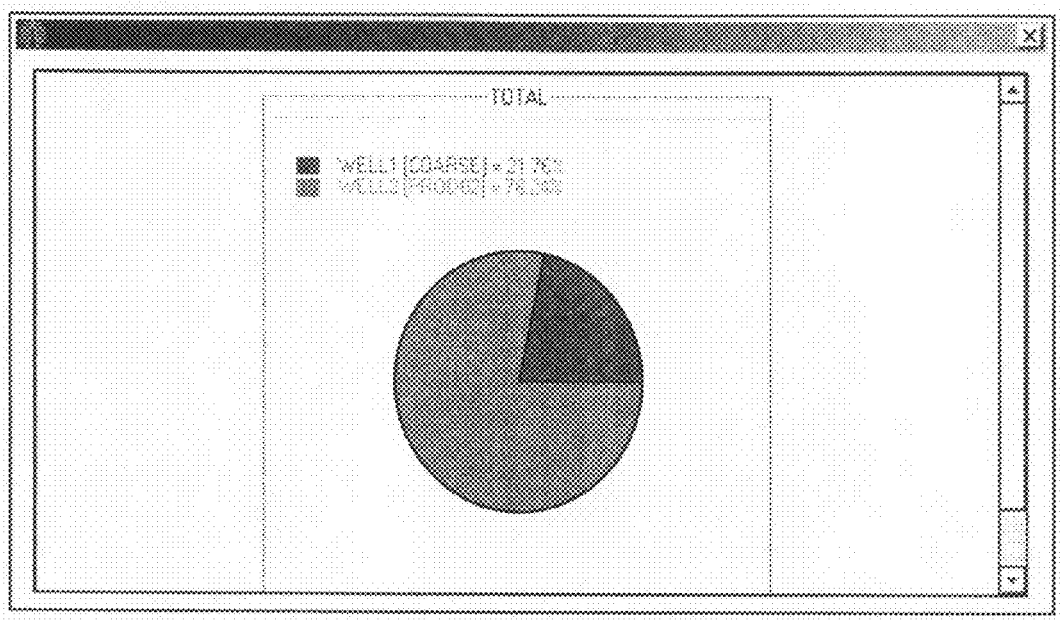
FIG. 4 illustrates an exemplary display of well allocation factors produced by the streamline analysis techniques of the present invention.

Various exemplary streamline analysis techniques utilizing the StreamCalc results include, but are not limited to: 1) the use of point trajectories to display the flow field (FIG. 3A); 2) the use of travel time along the trajectories, also referred to as time-of-flight ("TOF"), as an indicator of the time required for a cell's fluid to reach a producer or conversely for an injected fluid to reach a particular cell; 3) the identification of reservoir regions that are drained or influenced by particular wells; 4) the computation of well allocation factors, i.e.—the percentage of production or injection across wells (FIG. 4); 5) the calculation of reservoir sweep efficiencies, i.e.—the reservoir volume contacted as a percentage of fluid volumes produced or injected; and 6) fluid breakthrough times, which are represented by the streamline with the smallest value of TOF that connects an injector-producer well pair. In FIG. 3A, streamlines 300 are shaded according to common injector-producer well pairs with lighter shading representing connections between Well 1 and Well 2 while darker shading represents connections between Well 1 and Well 3. Again, color coding may be preferred over shading the streamlines 300. In FIG. 4, the different shading represents the percentage contribution of offset wells to a particular production or injection well.

In step 105, the results from step 104 are saved in the database and/or other ASCII files in tabular (spread sheet) formats.

Exemplary output files may be described in the manner set forth in Table 2 below.

TABLE 2

| File Ext. | Description |
| --- | --- |
| .tof | Contains time-of-flight connected volumes for each well and for the field. (There is also a summary.tof file, which contains only the maximum connected volume for each well.) |
| .waf | Contains well allocation factors for each well. The results are subdivided by region. |
| .out | Provides a log of streamline generation process. It can contain error and warning messages that help diagnose the state of a run. |
| .wrn | Contains warning messages, if any. |

TABLE 2-continued

| File Ext. | Description |
| --- | --- |
| .slc | Contains streamline data in 3DSL format. |
| .vdb | Contains streamline data in Nexus ®, VIP ® and AssetView ® format |

Figure 3B:
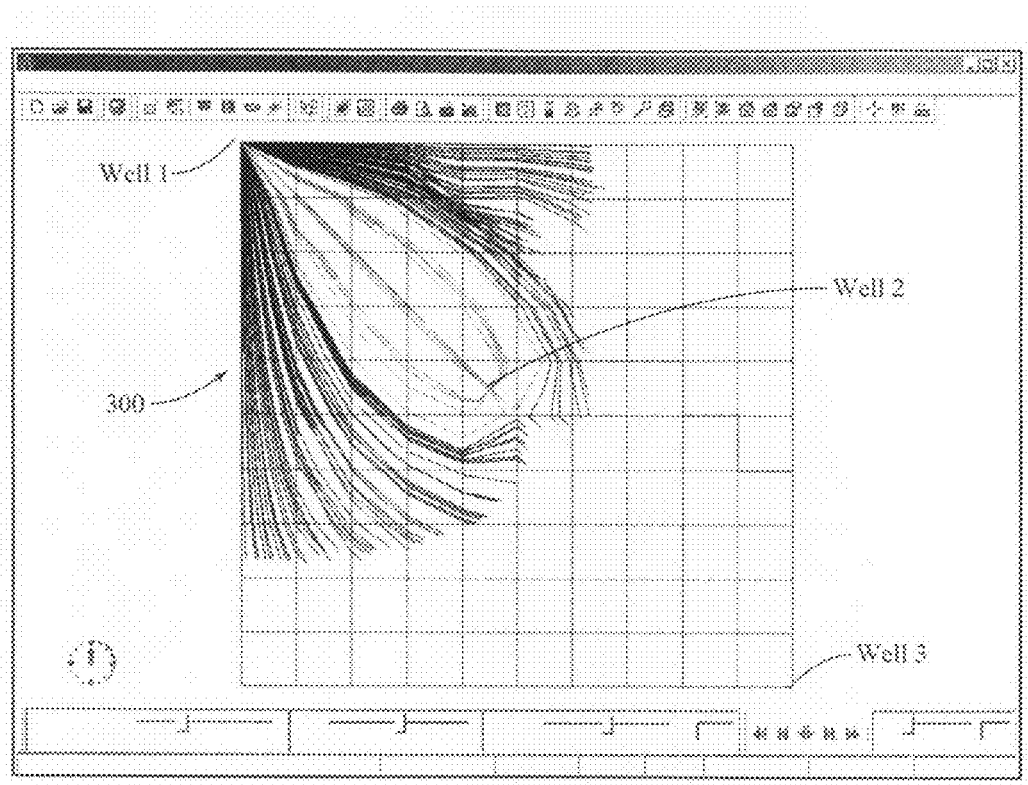
FIG. 3B illustrates an exemplary display of an analysis technique that filters the streamline tracing based on time-of-flight relative to the injection end.
Figure 3C:
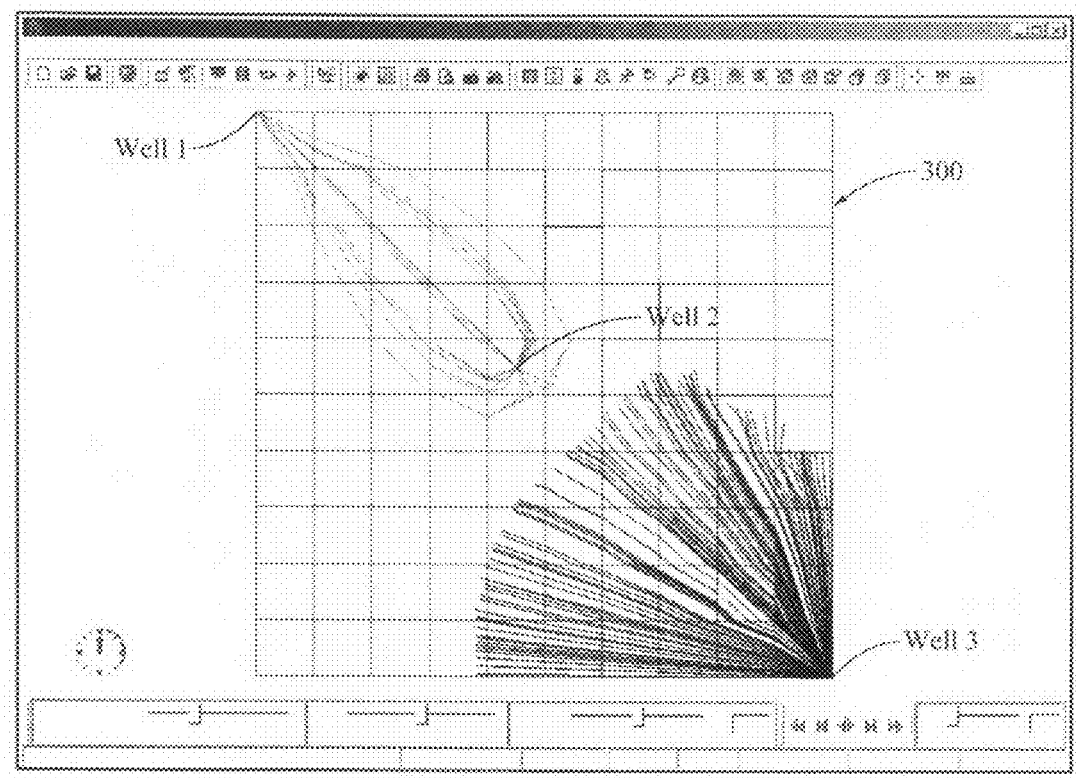
FIG. 3C illustrates an exemplary display of an analysis technique that filters the streamline tracing based on time-of-flight relative to the production end.
Figure 5:
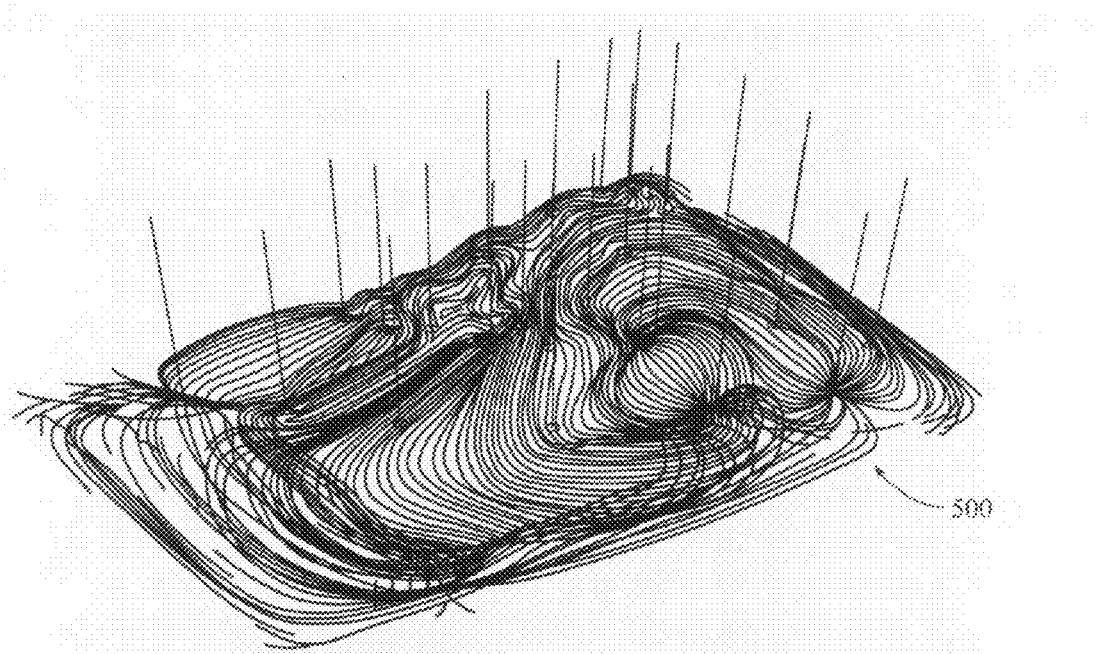
FIG. 5 illustrates an exemplary display of streamlines computed according to the present invention.
Figure 6:
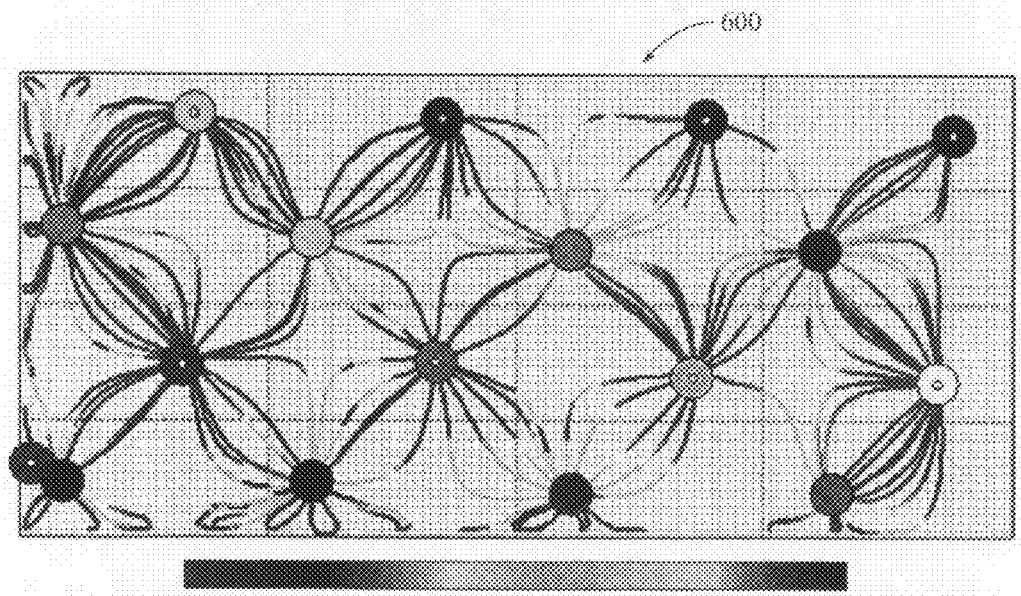
FIG. 6 is a two-dimensional display of a portion of the streamlines illustrated in FIG. 5 with time-of-flight information.

In step 106, the streamline trajectories, and other associated data, may be displayed using AssetView®, which is another commercial software application marketed by Landmark Graphics Corp., for analysis. AssetView® provides the tools by which you can evaluate the flow rates by quantifying and visualizing sweeps through streamline displays and time-of-flight displays. In FIG. 5, for example, an exemplary AssetView® display of simple streamlines 500 is illustrated in connection with various injection wells and production wells. Two-dimensional time-of-flight information may also be mapped onto the streamlines 600 as illustrated by the exemplary AssetView® display in FIG. 6. By placing a particle on any streamline, the distance along that streamline, as a function of time, can be mapped onto the streamline from the velocity field. By shading or color coding this information, time-of-flight information can be generated along the streamlines. This information may also be used to filter on time-of-flight information and provide a visual representation of the front, originating from individual injectors, and ending at the producers as illustrated by the exemplary AssetView® displays in FIG. 3B and FIG. 3C. In FIG. 3B, streamlines 300 are truncated at TOF=7000 days relative to the streamline injection end thus, illustrating the front relative to injection Well 1. The green streamlines connect Well 1 and Well 2 while the blue streamlines connect Well 1 and Well 3. In FIG. 3C, the streamlines 300 are truncated at TOF=7000 days relative to the streamline production end thus, illustrating the front relative to producer Well 2 and producer Well 3. The green streamlines connect Well 1 and Well 2 while the blue streamlines connect Well 1 and Well 3.

Figure 7:
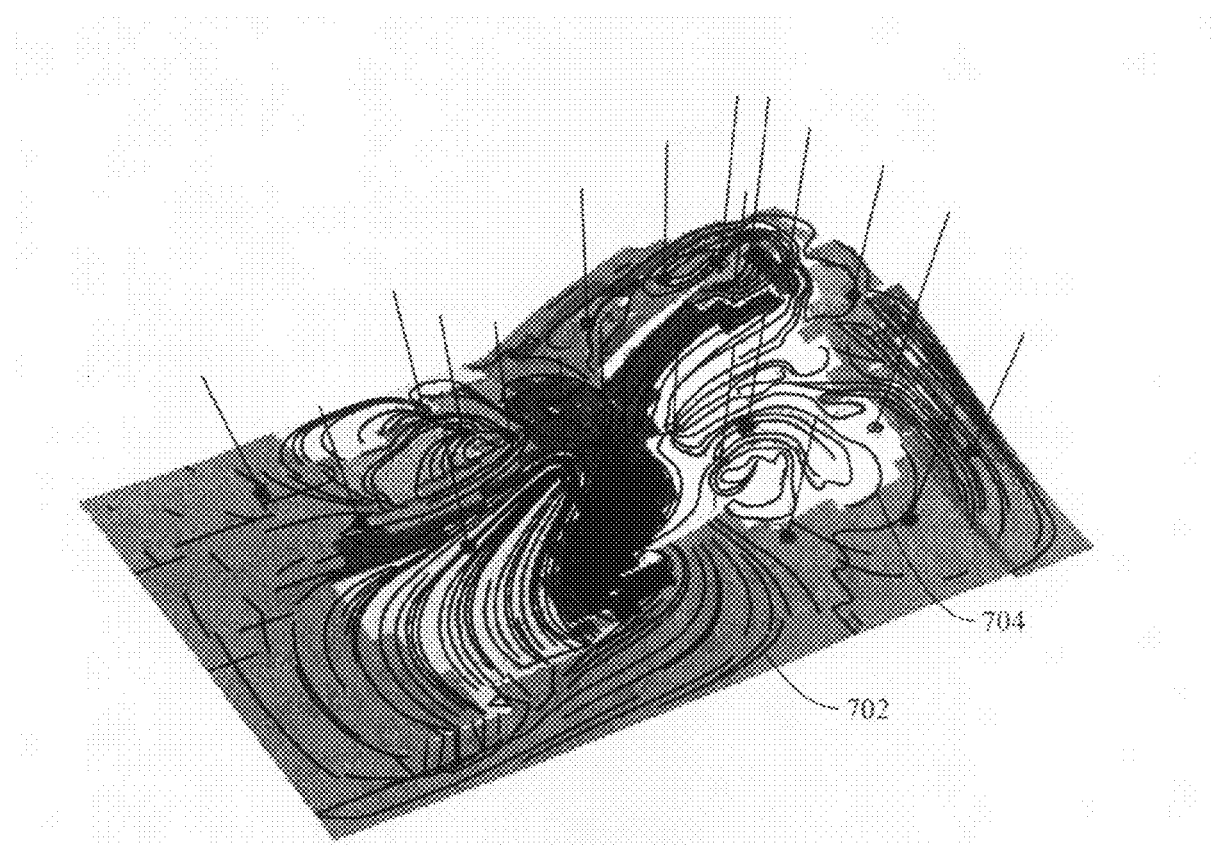
FIG. 7 is a three-dimensional display of the streamlines illustrated in FIG. 5 that includes grid-blocks.

A three-dimensional view of the same type of information illustrated in FIG. 5 can be generated, for example, and coded either by streamline 702 or by gridblock 704 as illustrated by the exemplary AssetView® display in FIG. 7. The shading on the gridblock 704 represents the producer well that a particle would flow to over time. The different shading represents different drainage areas that are attributed to different wells. As an alternative, shading or color coding could be mapped onto the streamlines to represent a more conventional injector-producer pairing, as illustrated by the exemplary AssetView® displays in FIGS. 3A-3C.

Figure 1B:
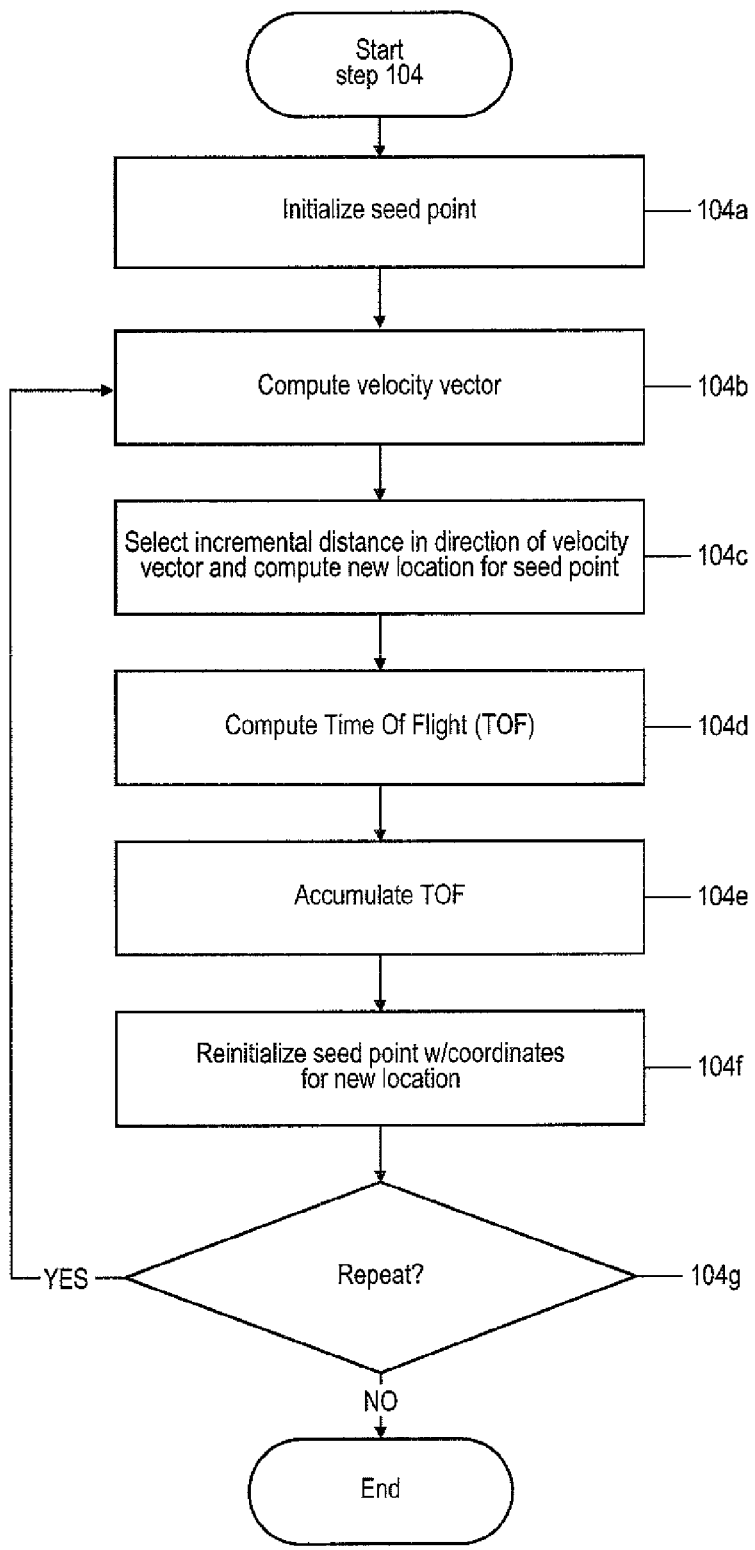
FIG. 1B is a flow diagram illustrating a method for implementing the present invention.
Figure 2B:
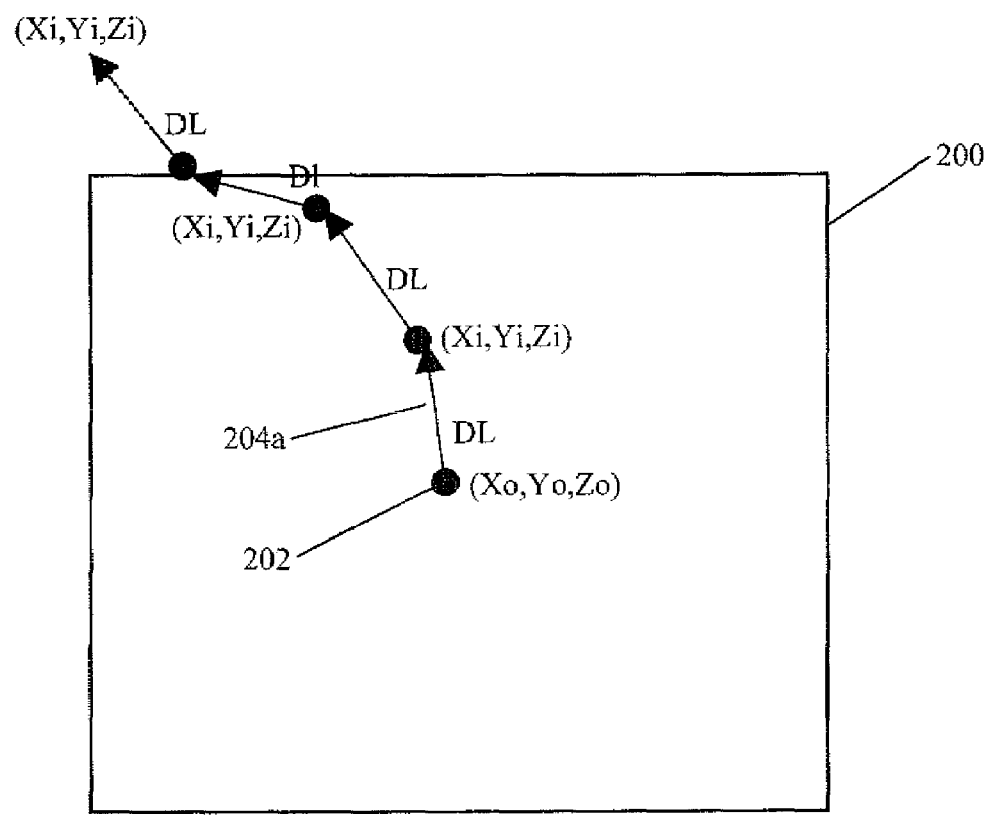
FIG. 2B illustrates an exemplary computation of a streamline trajectory according to the present invention.

Referring now to FIG. 1B and FIG. 2B, a preferred method for computing a streamline trajectory at step 104 in FIG. 1A and an exemplary computation are illustrated. In step 104*a*, the seed point 202 at the center of simulation grid cell 200 is initialized (Xo,Yo,Zo) and the time-of-flight is set to zero.

In step 104*b*, a velocity vector 204*a* is computed for the seed point 202. The velocity vector 204*a* may be computed using the techniques and algorithms described in the Society of Petroleum Engineers article "A New Particle Tracking Algorithm For Tracer Flow Simulation" by Liu, Parker, and Camilleri ("SPE 51905"), which is incorporated herein by reference. Using the methods and algorithms described in SPE 51905, the velocity vector 204*a* may be computed at any point (x,y,z) in coordinate space.

In step 104*c*, a predetermined incremental distance (DL) is selected in the direction of the velocity vector 204*a* and a new location (Xi,Yi,Zi) for the seed point 202 is computed by techniques well know in the art.

In step 104*d*, an incremental time-of-flight (DT) is computed using the incremental distance (DL) and the computed velocity (VEL) for the velocity vector 204*a*: DT=DL/VEL.

In step 104*e*, an accumulated time-of-flight is computed: TOF=TOF+DT

In step 104*f*, the seed point 202 is reinitialized with the coordinates (Xi,Yi,Zi) for the new location.

In step 104*g*, the method may be repeated beginning at step 104*b*.

Each time a streamline crosses into an adjacent grid cell, the techniques described in SPE 51905 may be used to compute a Dl, which is smaller than DL, and the corresponding DT, as illustrated in FIG. 2B, so that the new location (Xi,Yi, Zi) for the seed point 202 is computed to coincide exactly with the grid cell boundary. The streamline is then advanced using the velocities from the adjacent grid cell.

The method illustrated in FIG. 1B may be terminated when either the velocity vector computed in step 104*b* is less than some predetermined value, which could indicate a stagnation region, or when the location of the seed point 202 is moved near a production well (sink). The method may be repeated, in reverse, starting from the seed point 202, but the velocity vector is multiplied by −1 to represent the reverse flow direction. This time the method may be terminated when either the velocity vector computed in step 104*b* is less than a predetermined value, which could indicate a stagnation region, or when the location of the seed point 202 is moved near an injection well (source). The time-of-flight results from the repetition of the method thus described may be combined and adjusted so that the time-of-flight will take on a value of zero at the source end of the streamline and increases in the direction toward the sink end.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. Nexus®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, mini-computers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 8:
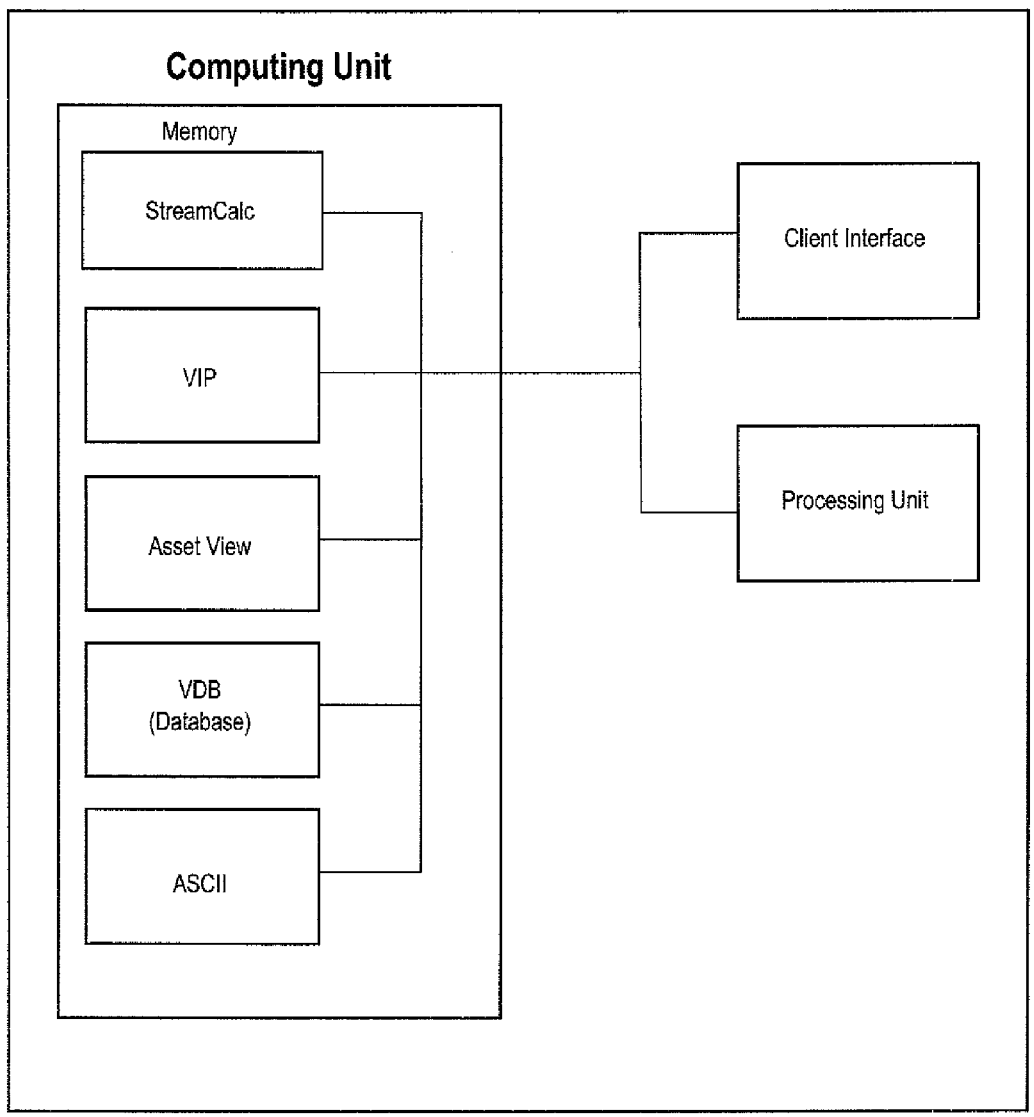
FIG. 8 is a block diagram illustrating a computer system for implementing the present invention.

Referring now to FIG. 8, a block diagram of a system for implementing the present invention on a computer is illustrated. The system includes a computing unit, sometimes referred to as a computing system, which contains memory, application programs, a database, ASCII files, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the workflow and methods described herein. The memory therefore, includes a Stream-Calc module, which enables the method described in FIG. 1B, and other components.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and the interconnection are well known.

While the present invention has been described in connection with presently preferred embodiments, it will be understood by those skilled in the art that it is not intended to limit the invention to those embodiments. Although the illustrated embodiments of the present invention relate to the use of velocity flux data in the oil and gas industry, for example, the present invention may be applied to any suitable velocity flux data in other fields and disciplines. It is therefore, contemplated that various alternative embodiments and modifications may be made to the disclosed embodiments without departing from the spirit and scope of the invention defined by the appended claims and equivalents thereof.

The invention claimed is:

1. A method for calculating a streamline, comprising:
initializing a seed point within a simulation grid cell;
computing a velocity vector for the seed point;
selecting an incremental distance in a direction of the velocity vector;
computing coordinates for a new seed point location based on the incremental distance and the direction of the velocity vector;
computing another velocity vector for the seed point;
selecting an incremental distance in a direction of the another velocity vector;
computing coordinates for another new seed point location based on the incremental distance and the direction of the another velocity vector;
computing an incremental time of flight for each incremental distance based on a velocity for each respective velocity vector and the respective incremental distance or a velocity for each respective another velocity vector and the respective incremental distance;
mapping a color for each incremental time of flight to each respective incremental distance;
computing an accumulated time of flight based on a sum total of each incremental time of flight;
adjusting the accumulated time of flight to zero at an end of the streamline nearest an injection well; and
displaying each color representing the accumulated time of flight on the streamline between the end of the streamline nearest the injection well and another end of the streamline nearest a production well or a stagnation region.

2. The method of claim 1, further comprising:
a) re-initializing the seed point with the new seed point location coordinates;
b) re-initializing the seed point with the another new seed point location coordinates;
c) repeating the steps of computing a velocity vector for the seed point reinitialized with the new seed point location coordinates, selecting an incremental distance in a direction of the velocity vector, and computing coordinates for a new seed point location based on the incremental distance and the direction of the velocity vector;
d) repeating the steps of computing another velocity vector for the seed point reinitialized with the another new seed point location coordinates, selecting an incremental distance in a direction of the another velocity vector, and computing coordinates for another new seed point location based on the incremental distance and the direction of the another velocity vector; and
e) repeating steps a-d until the new seed point location coordinates and the another new seed point location coordinates reach the production well, the injection well, or the stagnation region.

3. The method of claim 1, further comprising repeating the steps of claim 1 for each simulation grid cell.

4. The method of claim 1, wherein the velocity vector for the seed point is computed from simulated fluxes at each cell face of the grid cell.

5. The method of claim 4, wherein the simulated fluxes are represented by a normalized oil phase velocity, a normalized gas phase velocity and a normalized water phase velocity for each cell face.

6. The method of claim 1, wherein the selected incremental distance is predetermined if it is contained within the simulation grid cell and the selected incremental distance is computed if the streamline crosses into another simulation grid cell so that the coordinates for the new seed point location coincide with a boundary between the grid cell and the another grid cell, and the velocity vector for the seed point with the coordinates for the new seed point location that coincide with the boundary is computed from simulated fluxes at each cell face of the another grid cell.

7. The method of claim 1, further comprising:
initializing another seed point within the simulation grid cell;
computing a velocity vector for the another seed point;
selecting an incremental distance in a direction of the velocity vector; and
computing coordinates for a new another seed point location based on the incremental distance and the direction of the velocity vector.

8. A program storage device having computer executable instructions for calculating a streamline, the instructions being executable to implement:
initializing a seed point within a simulation grid cell;
computing a velocity vector for the seed point;
selecting an incremental distance in a direction of the velocity vector;
computing coordinates for a new seed point location based on the incremental distance and the direction of the velocity vector;
computing another velocity vector for the seed point;
selecting an incremental distance in a direction of the another velocity vector;
computing coordinates for another new seed point location based on the incremental distance and the direction of the another velocity vector;
computing an incremental time of flight for each incremental distance based on a velocity for each respective velocity vector and the respective incremental distance or a velocity for each respective another velocity vector and the respective incremental distance;
mapping a color for each incremental time of flight to each respective incremental distance;
computing an accumulated time of flight based on a sum total of each incremental time of flight;
adjusting the accumulated time of flight to zero at an end of the streamline nearest an injection well; and
displaying each color representing the accumulated time of flight on the streamline between the end of the streamline nearest the injection well and another end of a streamline nearest the production well or a stagnation region.

9. The program storage device of claim 8, further comprising:
   a) re-initializing the seed point with the new seed point location coordinates;
   b) re-initializing the seed point with the another new seed point location coordinates;
   c) repeating the steps of computing a velocity vector for the seed point reinitialized with the new seed point location coordinates, selecting an incremental distance in a direction of the velocity vector, and computing coordinates for a new seed point location based on the incremental distance and the direction of the velocity vector;
   d) repeating the steps of computing another velocity vector for the seed point reinitialized with the another new seed point location coordinates, selecting an incremental distance in a direction of the another velocity vector, and computing coordinates for another new seed point location based on the incremental distance and the direction of the another velocity vector; and
   e) repeating steps a-d until the new seed point location coordinates and the another new seed point location coordinates reach the production well, the injection well, or the stagnation region.

10. The program storage device of claim 8, further comprising repeating the steps of claim 8 for each simulation grid.

11. The program storage device of claim 8, wherein the velocity vector for the seed point is computed from simulated fluxes at each cell face of the grid cell.

12. The program storage device of claim 11, wherein the simulated fluxes are represented by a normalized oil phase velocity, a normalized gas phase velocity and a normalized water phase velocity for each cell face.

13. The program storage device of claim 8, wherein the selected incremental distance is predetermined if it is contained within the simulation grid cell and the selected incremental distance is computed if the streamline crosses into another simulation grid cell so that the coordinates for the new seed point location coincide with a boundary between the grid cell and the another grid cell, and the velocity vector for the seed point with the coordinates for the new seed point location that coincide with the boundary is computed from simulated fluxes at each cell face of the another grid cell.

14. The program storage device of claim 8, further comprising:
   initializing another seed point within the simulation grid cell;
   computing a velocity vector for the another seed point;
   selecting an incremental distance in a direction of the velocity vector; and
   computing coordinates for a new another seed point location based on the incremental distance and the direction of the velocity vector.

* * * * *